Figure 1:
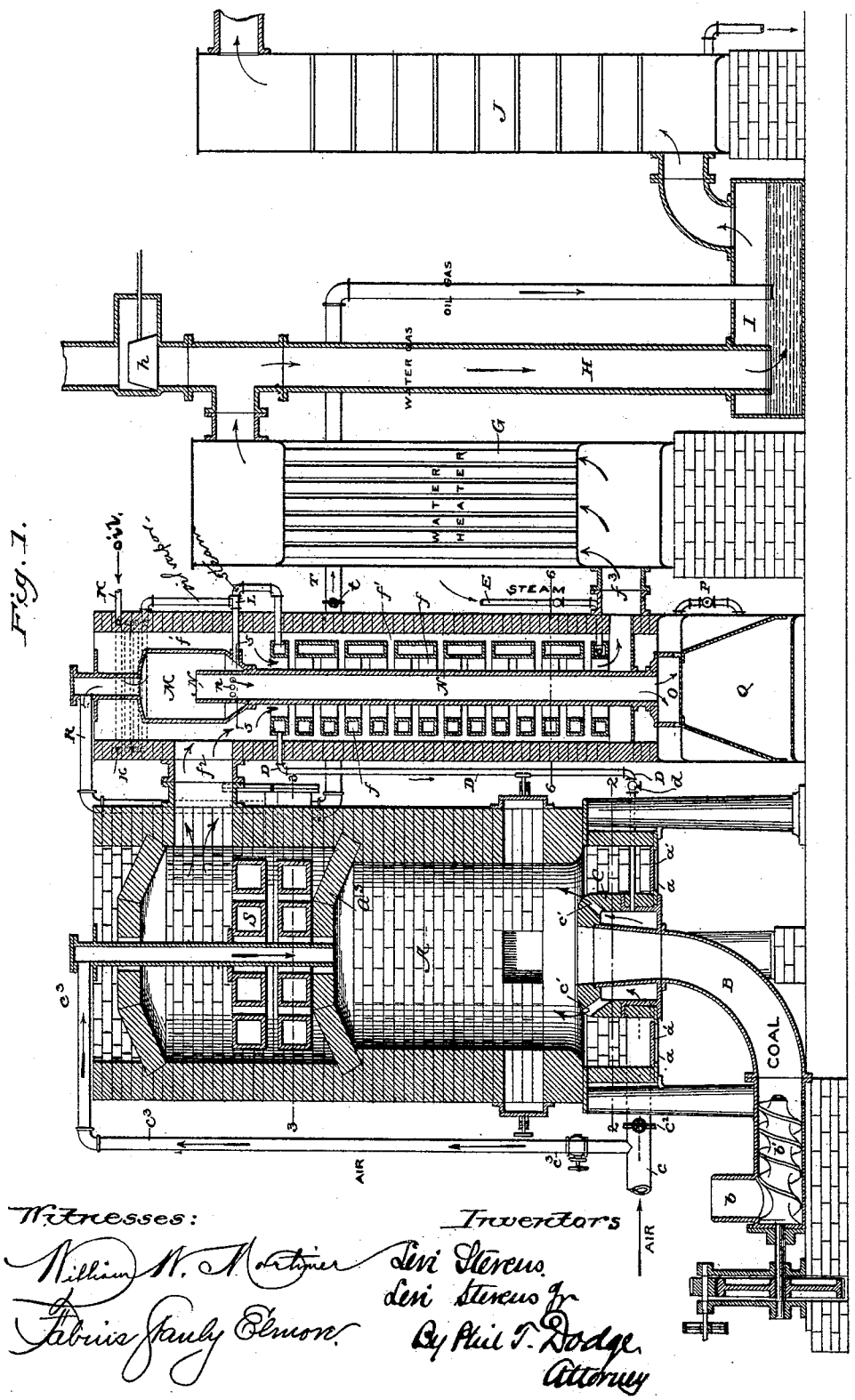

(No Model.) 2 Sheets—Sheet 1.

L. STEVENS & L. STEVENS, Jr.
GAS APPARATUS.

No. 495,917. Patented Apr. 18, 1893.

(No Model.) 2 Sheets—Sheet 2.
L. STEVENS & L. STEVENS, Jr.
GAS APPARATUS.
No. 495,917. Patented Apr. 18, 1893.
Fig. 2.
on line 2-2
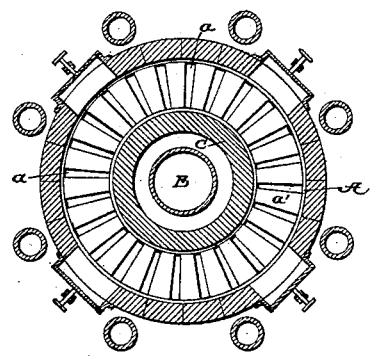
Fig. 3.
on line 3-3
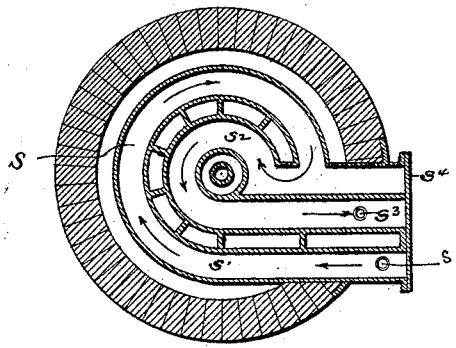
Fig. 4.  Fig. 6.  Fig. 5.
                on line 5-5
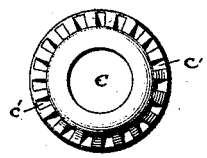 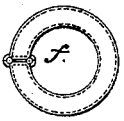 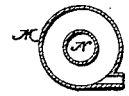
Witnesses:  Inventors
William W. Mortimer  Levi Stevens
Fabius Stanly Elmore  Levi Stevens, Jr
 By Phil. T. Dodge atty

UNITED STATES PATENT OFFICE.

LEVI STEVENS AND LEVI STEVENS, JR., OF TRENTON, NEW JERSEY.

GAS APPARATUS.

SPECIFICATION forming part of Letters Patent No. 495,917, dated April 18, 1893.

Application filed December 15, 1890. Serial No. 374,787. (No model.)

*To all whom it may concern:*

Be it known that we, LEVI STEVENS and LEVI STEVENS, Jr., of Trenton, in the county of Mercer and State of New Jersey, have invented certain Improvements in Gas Apparatus, of which the following is a specification.

Our invention relates to an apparatus wherein water gas and oil gas may be simultaneously and economically manufactured. The oil gas is produced by combining the highly heated vapor of petroleum or other suitable hydro-carbon with super-heated steam, and then passing the resulting mixture through a retort, heated to such temperature as to effect a decomposition and recomposition of the elements in the form of fixed gas. The water gas is produced by delivering super-heated steam through a mass of burning coal in a generating chamber supplied with air to maintain combustion. The coal is supplied continuously in an upward direction into the base of the generator or combustion chamber, and the hot gases and products of combustion are applied to retort the oil gas, superheat the steam, vaporize the oil, and heat the feed water of the steam generator.

In the accompanying drawings,—Figure 1 is a longitudinal vertical central section through our apparatus. Fig. 2 is a horizontal section through the base of the generator on the line 2—2 of Fig. 1. Fig. 3 is a section through the generator and retorts therein on the line 3—3 of Fig. 1. Fig. 4 is a top plan view of the coal supply tube at the base of the generator. Fig. 5 is a cross-section on the line 5—5 of Fig. 1, showing the mixing chamber for the hydro-carbon oil and steam. Fig. 6 is a top plan view of one of the superheater sections.

Referring to the drawings,—A represents the generator chamber of masonry or other suitable material closed at the base by suitable ash-delivery valves consisting in the present case of a plate, $a$, having openings for the discharge of the ashes, closed by a revolving ring $a'$, having corresponding openings therethrough. Under usual conditions the openings are closed so that the admission of air is prevented.

B is a coal supply pipe, having its delivery end extended upward centrally through and above the base of the chamber. Its outer end is continued horizontally and provided with a feed hopper, $b$, and with a feed screw, $b'$, by means of which the coal is gradually, continuously and forcibly delivered upward into and through the burning mass in the generator.

Within the generator the uprising end of the free pipe is surrounded by a hollow jacket, C, constantly supplied with air through pipe, $c$, from a blower, and provided at the top with numerous slits or openings, $c'$, through which the air is distributed in the burning mass to maintain the requisite temperature. The hollow jacket is also supplied at the proper time during the production of water gas with superheated steam through a pipe, D, having a stop-valve, $d$. The steam is received from a boiler or generator of any suitable character and delivered through pipe E, into the superheater, $f$, whence it passes to pipe D above mentioned.

The superheater consists of a series of hollow annular communicating sections $f$, such as shown in Fig. 6, arranged in a column in a chamber, $f'$. This chamber receives the highly heated water gas and products of combustion from the generator through a top passage, $f^2$, and discharges them through a bottom chamber, $f^3$, into the base of the upright tubular water heater, G, which in turn delivers them through dip pipe H, and thence through the hydraulic main, I, to the ordinary washer and scrubber J.

The dip-pipe H is provided at its upper end with a valve $h$, so that it may be opened to permit a direct discharge of the products when blowing up the fire in the generator.

The air supply pipe $c$, is provided with a stop-valve, $c^2$, and with a valved branch-pipe, $c^3$, through which air is blown downward into the top of the generator chamber at the same time that air is introduced into the base of said chamber.

The foregoing parts constitute a complete and operative apparatus, in which water gas may be produced continuously by keeping up the supply of coal and air to maintain the combustion at the requisite temperature, and in the meantime passing superheated steam through the incandescent mass.

Passing now to the additional parts for producing the oil gas, K represents an oil supply pipe coiled and embedded in the masonry at the top of the superheating chamber, and connected with and discharging into a pipe, L, which leads from the top of the superheater into a mixing chamber, M, in the top of the superheating chamber. By this arrangement the oil is heated and vaporized and its vapor combined with the superheated steam, and the resulting mixture introduced into the chamber M. This chamber is subjected to the direct action of the highly heated gases escaping from the generator and is maintained thereby at a temperature of about 1,200° Fahrenheit.

In order to deprive the oil vapor of the asphaltum and earthy matters contained therein the pipe L is arranged to deliver tangentially into the circular chamber M, as plainly shown in Fig. 5, so that the inflowing vapor and steam acquire a rapid rotary motion within the chamber. The lighter and volatile products assuming the gaseous form rise in the chamber while the heavier products settle to its base where they escape through openings $n$, into a vertical pipe, N, which extends down through the interior of the superheater to receiving tank, O, at the base, this tank communicating in turn through a valved pipe, P, with a tar tank, Q, thereunder, so that the residual products accumulating in chamber O, may be delivered from time to time into the tank below. The pipe N is projected upward into the chamber M, above the level of the feed-pipe L, so that it assists in compelling the rotary motion of the inflowing vapor. The mingled steam and oil vapor is discharged from the top of the mixing chamber M, through a pipe, R, into a superheater, S, located in the top of the generator or combustion chamber A, subject to the action of the ascending flame and gas. In this superheater the mixture is subjected to a temperature of about 1,800° Fahrenheit, the effect of which is to decompose and recompose the elements and produce a fixed oil gas which is discharged from the retort through the dip-pipe T, into the hydraulic main I, where it is mingled with the water gas to enrich the same for illuminating purposes. The oil gas pipe T, will be provided with a suitable stop-valve, $t$.

The retort S, for the oil gas, is preferably constructed as shown in Figs. 1 and 3, of two duplicate hollow communicating castings lying one above the other. As shown in Fig. 3, the upper section is provided with the inlet, $s$, whence a discharge, $s'$, is extended in a winding course to the center, where it communicates with the discharge, $s^2$, leading outward to the pipe $s^3$, through which the vapor descends to the lower section through which it pursues a similar course to the discharge-pipe T. The passages $s'$, $s^2$, lead outward through the side of the masonry and are covered by a plate, $s^4$, the removal of which gives access to the interior of the retort when required. The retort is sustained in the top of the generator by an arched wall or bridge, $a^3$.

It will be observed that by the apparatus above described the production of either water gas or oil gas may be carried on independently, or that the two gases may be produced simultaneously. It is also to be noted that the heat of the outgoing gases and vapors is fully utilized instead of being allowed to go to waste.

By introducting atmospheric oxygen to the base of the incandescent mass at the same time that atmospheric oxygen is supplied directly to the top of the mass we are enabled to carry on in an efficient manner the burning of the carbon at the base and the gas at the top, and thus to maintain in an economical manner the temperature of the entire mass. In ordinary generators in which air is introduced at the base alone or at the base and top alternately it is found extremely difficult to maintain the proper temperature in the top of the chamber.

It will be observed that the outgoing products ascend around the upper air pipe so that the air delivered into the top of the chamber is highly heated before reaching the point of combustion.

Having thus described our invention, what we claim is—

1. In a gas producing apparatus, a generator chamber provided with a gas outlet and having a closed annular base, in combination with a coal supply pipe having its delivery end projected upward through and above the base-plate, means for forcibly delivering coal through said pipe, and means for delivering air, steam, and hydro-carbon vapor into said chamber.

2. In a gas apparatus, a generator chamber having its base closed by an ash-valve in combination with a coal supply pipe projected upward into the chamber through and above the base, whereby the ashes may be delivered from beneath the fresh coal, means for forcing coal through said supply pipe, and means for delivering air, steam, and hydro-carbon vapor into said chamber.

3. The generator and connections for supplying the same with coal, air and steam, in combination with the retort in its top, the mixing chamber communicating with the retort, the steam superheater, pipes for leading oil and superheated steam into the mixing chamber, and conduits leading the products of combustion from the generator into contact with the superheater and the mixing chamber: whereby the heat developed in the generator is applied in the production of both water and oil gas.

4. In a gas apparatus, the mixing chamber M, having the tangential inlet, the elevated central outlet a steam supply pipe and the uprising drain-pipe, N, substantially as shown and described.

5. In a gas apparatus the combination of the generator, the superheating chamber connected with, and arranged to receive the products from, the top of the generator, the mixing chamber located in the superheating chamber, an oil-vaporizing coil connected to deliver into the mixing chamber, a steam passage through the superheater also connected with the mixing chamber and suitable air oil and steam supply pipes.

6. In a gas apparatus, a closed generator or combustion chamber having a feed opening through the bottom thereof, and means for feeding coal through said opening, in combination with means for introducing atmospheric air simultaneously to the top and bottom of said chamber; said means being so disposed as that one of the currents of air shall move downward from above the charge of coal and the other upward through said charge.

7. In a gas apparatus, the combination of a closed generator or combustion chamber having a feed opening through the bottom, means for feeding coal through said opening an air blast pipe opening into the lower part of said chamber, and an air blast pipe opening into the upper part of said chamber,—the upper blast pipe being directed downward substantially as described to cause its blast to meet and retard and consume the upward current of gas from the lower pipe.

In testimony whereof we hereunto set our hands, this 10th day of December, 1890, in the presence of two attesting witnesses.

LEVI STEVENS.
LEVI STEVENS, JR.

Witnesses:
P. T. DODGE,
FABIUS STANLEY ELMORE.